Dec. 15, 1970   K. F. SINCLAIR   3,548,207
DIRECTIONAL RADIATION DETECTOR

Filed Aug. 15, 1969   2 Sheets-Sheet 1

INVENTOR.
KENNETH F. SINCLAIR
BY
ATTORNEYS

United States Patent Office 3,548,207
Patented Dec. 15, 1970

3,548,207
DIRECTIONAL RADIATION DETECTOR
Kenneth F. Sinclair, Sunnyvale, Calif., assignor to the United States of America as represented by the Secretary of the Army
Continuation-in-part of application Ser. No. 599,997, Dec. 6, 1966. This application Aug. 15, 1969, Ser. No. 850,506
Int. Cl. G01t 1/18
U.S. Cl. 250—83.6                8 Claims

ABSTRACT OF THE DISCLOSURE

Two radiation responsive devices are positioned adjacent each other with their frontal areas in a common plane. A radiation attenuation element is positioned in the path directly in front of one of the radiation responsive devices. Differential amplification means and indication means receive the outputs of the radiation responsive devices to provide the indications having an amplitude indicating the direction of a source of radiation and a sense, such as polarity, indicating the direction of the source of radiation relative to each of two orthogonally related axes of rotation.

CROSS REFERENCE TO RELATED APPLICATION

The present application is a continuation-in-part of copending patent application S.N. 599,997 filed Dec. 6, 1966 in the name of the applicant.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Directional radiation detecting devices in current use generally employ a single radiation responsive means enclosed partially by a radiation shield. Directional characteristics and sensitivity of such devices are largely dependent upon the particular design of the shield and generally the shield is so arranged as to permit radiation to enter the detector only within a relatively small angle determined by the unshielded area. Accordingly, the prior art detector of this type is designed so that its response will be relatively insignificant unless the unshielded area is positioned in a direct line with a source of radiation. Such a shield, however, may weigh five to ten pounds in this type of apparatus and is relatively quite large, obviously resulting in this type of prior art, devices being unsuitable for hand-held portable instruments. Moreover, in known instruments of the prior art type such as that described directional guidance to a source of radiation is limited to indications relative to a single rotational axis unless two such instruments are employed in a more complex and yet even more unwieldy and bulky instrument.

As will be readily appreciated by those skilled in the art, it is desirable in many radiation detecting operations that the detection instruments be readily adaptable to hand-held use by an operator. Accordingly, a prime consideration in the design of such an instrument is its weight and size. Consequently, instruments employing techniques and concepts which result in reduction in weight and size are most desirable.

SUMMARY OF THE INVENTION

The present invention conceives the employment of two preferably identical radiation responsive means having frontal areas which are relatively insensitive to the direction from which radiation impinges upon them. A radiation attenuating element is positioned in the frontal path immediately before one of the radiation responsive means and a differential amplification means is provided to produce an output as a function of the difference in amplitude between the outputs produced by the two radiation responsive means. Because of the unique concept of the present invention, the output of the differential amplifier means has an amplitude and also a sense indicative of the direction of a source of radiation relative to each of two axes of rotation which are orthogonally related. One of the axis of rotation may be defined as lying in the common plane of the frontal areas of the two radiation responsive means and also through the two centers of the frontal areas.

In a typical embodiment of the present invention, the apparatus may be employed so that one of the described axes of rotation is vertically oriented and therefore in a hand-held instrument of the type conceived and taught by the present invention would indicate the direction of a source of radiation as being either to the left or to the right relative to the operator. The second axis of rotation may be defined as being in the plane which is common to both frontal areas of the two radiation responsive means and passing through the midpoint between the two frontal areas. Such axis of rotation is orthogonally related to the previously described axis of rotation and therefore would be horizontally oriented if the first axis of rotation were vertically oriented as previously assumed. Directional information with respect to the second axis of rotation would indicate whether the source of radiation were above or below the point at which the apparatus is aimed.

The indicating means employed with the present invention may be a zero-centered meter of a conventional electrical type where a down-scale reading indicates direction relative to one axis of rotation, and an up-scale reading indicates direction relative to another axis of rotation; a center or null reading indicates that the apparatus is not directed at or near a source of radiation. The present invention, because of its simplicity and the fact that it has obviated a need for a large and weighty shield as was necessary in many prior art devices, may be embodied in a two part apparatus; one part containing the radiation responsive means, the attenuation means, together with a balanced network contained in a cylindrical probe approximately one and one half inches in diameter and six inches long, weighing less than one-half pound. The probe portion of the instrument is aimed so as to detect the direction of the source of radiation, battery sources of power, the differential amplifier, and a meter may be mounted on a single small panel and enclosed in the small case with the zero-center meter providing the visual indication of the direction of the source of radiation relative to two axes of rotation as previously described. Accordingly, the probe may be convienently held in one hand to be directed in different orientations for detection of a source of radiation while the meter, differential amplifier, etc., is held in another hand to observe the visual indications.

Accordingly, it is a primary object of the present invention to provide a light weight, portable radiation detector which employs only two radiation responsive means to produce directional information relative to two axis of rotation of the device.

Another most important object of the present invention is to provide a radiation detection device which obviates the requirement for a large shield or attenuator.

Yet another most important object of the present invention is to provide an apparatus for detecting the direction of a source of radiation which produces an output having an amplitude in one of two senses each of which indicates direction relative to one of two orthogonally related axes.

Another object of the present invention is to provide such an apparatus for detecting the source of radiation which includes means for balancing the desired operation of the apparatus when replacement of one or both of the radiation responsive means is required.

These and other features, objects, and advantages of the present invention will be more fully appreciated from an understanding of the operation of a preferred embodiment illustrated in the drawings as described in the following specification, and its scope will be defined in the appended claims.

DESCRIPTION OF THE PREFERRED EMBODIMENT

Figures 1, 2:
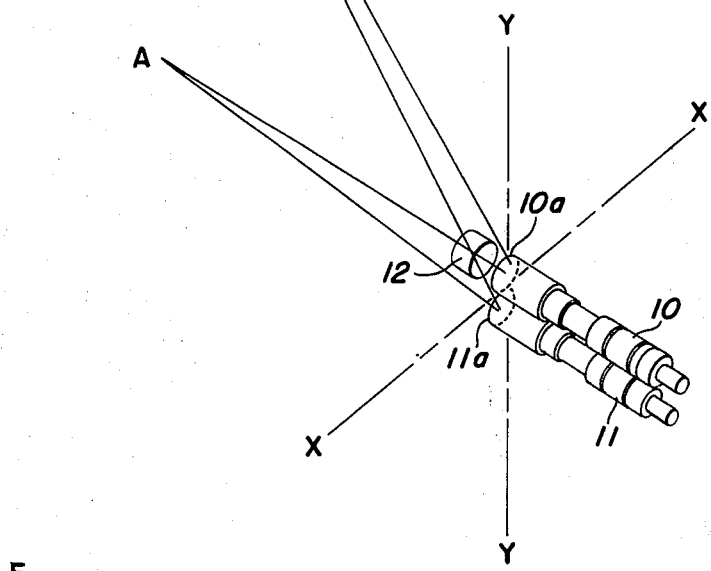
FIG. 1 is an isometric view illustrating a principle of operation of the present invention.
FIG. 2 is a top view illustrating the principle of operation of the present invention.

In FIG. 1, the disposition of two radiation responsive means 10 and 11 together with an attenuation element 12 is illustrated relative to two sources of radiation, designated A and B. In accordance with the concept of the present invention, the two radiation responsive means 10 and 11 have frontal areas designated at 10a and 11a, respectively, which are relatively insensitive to the direction from which radiation is received. That is to say, that the outputs which are generated by the radiation responsive means 10 and 11 are substantially the same whether or not the radiation impinging on their respective frontal areas 10a and 11a, is received from a side angle or directly from a frontal path. Accordingly, a source of radiation, such as that indicated at the location A, will strike the frontal area 11a of the radiation responsive means 11 with full intensity, but must pass through the attenuation element 12 directly in front of the radiation responsive means 10 to reach the frontal area 10a. As a result, the radiation responsive device 11 will generate a greater output in amplitude than the radiation responsive device 10.

However, if it be assumed for purposes of explanation and illustration, that the source of radiation is directly above A at location B, it will be seen that the radiation must pass through the attenuating element 12 to reach the frontal area 11a of the radiation responsive device 11, while the radiation will directly strike the frontal area of 10a of the radiation responsive device 10.

Since, as was previously mentioned, the frontal areas 10a and 11a of the radiation responsive devices 10 and 11 are relatively insensitive to the direction from which radiation is impinging upon them, a differential of outputs will result from the radiation received from the location B in which the radiation responsive device 10 will generate a greater output in amplitude than the attenuated radiation will generate in the radiation responsive device 11. Consequently, the differential in outputs between the radiation responsive devices 10 and 11 is of one sense when the radiation is received from the lower position, and of an opposite sense when radiation is received from the upper position. Thus, the device will provide a differential indication of the location of the source of radiation relative to the axis of rotation which may be defined as being in the common plane of the frontal areas 10a and 11a and passing through the midpoint between those areas as generally indicated at X—X. The radiation detection apparatus of the present invention provides another indication of direction about the second axis of rotation as indicated at Y—Y in FIG. 1.

Referring now to FIG. 2, there is shown a top view of the elements of the present invention illustrated in FIG. 1. Since the radiation responsive devices 10 and 11 are in adjacent vertical alignment, one upon another, as illustrated in FIG. 1, only the radiation responsive device 10 can be seen in FIG. 2. As illustrated in FIG. 1, the radiation attenuation element 12 is disposed immediately in the frontal path of the frontal area 10a of the radiation responsive device 10. Assuming a source of radiation C is located on a horizontal plane relative to the radiation responsive devices of the present invention, generally of the elevation indicated at A in FIG. 1, it can be seen as indicated in FIG. 2 that the emitted radiation will be significantly attenuated by the attenuation element 12 before reaching the radiation responsive device 10. However, since no attenuation element is disposed before the frontal area 11a of the radiation responsive device 11 which is positioned immediately below the radiation responsive device 10, the radiation responsive device 11 will receive a relatively high intensity of radiation. Therefore, the output of the radiation device 11 will be much greater than the output from the radiation device 10, producing a maximum differential.

When, however, a radiation source is located at either D or E, some small amount of unattenuated radiation will reach frontal area 10a of the radiation responsive device 10 so that it will provide greater output when a radiation source is located at C. Accordingly, there will be a somewhat less differential between the two outputs of the radiation responsive devices 10 and 11.

When the radiation source is located at points F and G, however, it will be apparent that considerable radiation will reach the frontal area of 10a of the radiation responsive device 11 so that a condition of balance or near balance will be generated between the outputs of the respective radiation responsive devices 10 and 11.

Thus, the concept of the present invention provides a small, compact device which needs only one attenuation element substantially of the size of the frontal area of one of its radiation responsive devices to provide outputs which are indicative of both the direction and the sense of the location of a source of radiation relative to two orthogonally related axis of rotation of the apparatus. In a typical embodiment the radiation attenuation element was a lead attenuator, ⅜ inch in diameter by 1½ inches long weighing only a few ounces.

Moreover, the concept of the present invention is such that these elements may be convienently and efficiently encased in a probe which is electrically connected to the remainder of the circuitry and a suitable source of electrical current, as well as an appropriate meter for visually indicating the output of the probe portion of the apparatus.

Figure 3:
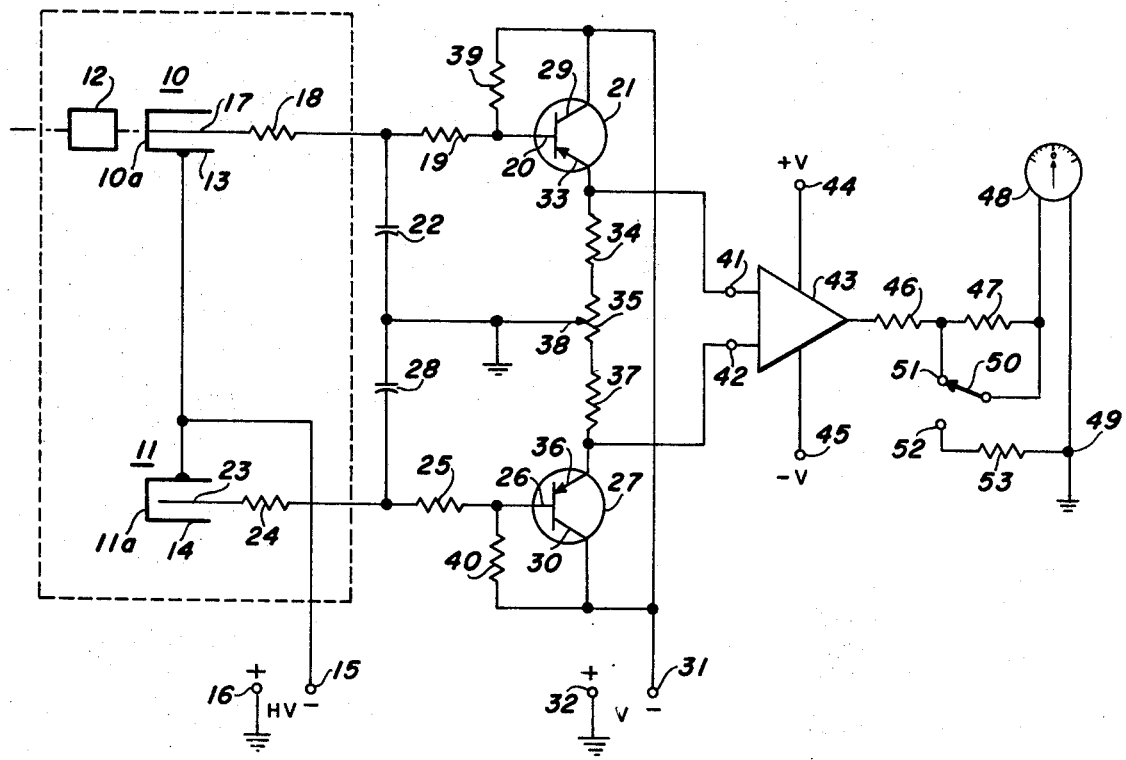
FIG. 3 is a schematic wiring diagram illustrating the electrical circuitry of the present invention.

Referring now to FIG. 3 there is shown a schematic wiring diagram for a preferred circuit embodying the teachings and concepts of the present invention. The same numerical designations have been employed for elements which are common to FIGS. 1, 2 and 3. As was previously mentioned, the radiation responsive devices employed in the present invention are preferably identical and may comprise Geiger-Mueller tubes. The electrical circuitry essentially comprises two symmetrical channels for comparing the signal outputs of the radiation responsive devices. Each channel comprises a Geiger-Mueller tube, an integrating circuit, and a pre-amplifier. The two channels generate an input to a differential amplifier.

As shown in FIG. 3, the cathodes 13 and 14 of the Geiger-Mueller tubes 10 and 11, respectively, are connected to a source of negative potential at terminal 15. The positive terminal, 16, of the source of potential is connected to ground. The anode 17 of the Geiger-Mueller tube 10, is connected serially through two resistors 18 and 19 to the base 20 of PNP transistor 21. A capacitor 22 is connected between the common terminals of resistors 18 and 19 and ground potential. A resistor 18 functions to essentially limit current and potential supplied to the base 20 of the transistor 21. The CR combination of resistor 19 and capacitor 22 forms an integrating network for averaging the pulse outputs from the Geiger-Mueller tube 11, before they are impressed upon the base 20 of the transistor 21.

In a similar manner, the anode 23 of Geiger-Mueller tube 11, is connected serially through resistors 24 and 25 to the base 26 of a PNP transistor 27. A capacitor 28 is connected between the common terminal of resistors 24 and 25 and ground potential. Accordingly, it will be seen that the elements in the second or lower channel in FIG. 3 are substantially identical to those in the upper channel previously described.

Transistors 21 and 27 are arranged as emitter-follower amplifiers. Consequently, the collectors 29 and 30, respectively, are connected to the negative terminal 31 of a source of potential. The positive terminal 32 of the source of potential is connected to ground potential. The emitter 33 of the transistor 21 is connected to ground potential through a load resistance comprising the series connected resistor 34 and a portion of the poteniometer 35. Similarly, the emitter 36 of the transistor 27 is connected to ground through the serial combination of the resistor 37 and a portion of the potentiometer 35. The variable tap 38 of the potentiometer 35 is maintained at ground potential. Appropriate resistors 39 and 40 provide bias for the bases 20 and 26 of the transistors 21 and 27 respectively.

The potentiometer 35, by means of its variable tap 38, is employed to vary the load resistance in each of the emitter circuits of the transistor emitter-follower amplifiers 21 and 27, and consequently to vary the gain of each of the emitter-follower amplifiers in an opposite manner. That is, when the gain of one emitter-follower permits the overall apparatus to be balanced or calibrated to account for variation in components, for example, or to balance or recalibrate the apparatus when one or both Geiger-Mueller tubes requires replacement.

The emitter 33 of transistor 21 and its counterpart emitter 36 of transistor 27 are connected as the inputs 41 and 42 to a differential amplifier 43. The differential amplifier 43 is provided with both positive and negative potentials as shown in terminals 44 and 45, respectively. The output of the differential amplifier 43 is connected through resistors 46 and 47 as an input to zero-center meter 48 which in turn is grounded at terminal 49. A switch 50 is provided to be connectable to either terminal 51 or terminal 52 to afford low and high sensitivity readings respectively. The high sensitivity is provided by the connection of switch 50 to terminal 52 which affords relatively low resistance through resistor 53 to ground.

In operation, when the probe of the novel apparatus for detecting direction of radiation is pointed or aimed directly at a source of radiation the attenuating element 12 will significantly attenuate the amount of radiation reaching the Geiger-Mueller tube 10, while an appreciably greater intensity of radiation will reach the Geiger-Mueller tube 11. Consequently, the emitter-follower 21 will have a significantly diminished output relative to the output of transistor 27. Accordingly, there is a significant differential in the inputs 41 and 42 of the differential amplifier 43. The arrangement illustrated in FIG. 3 may accordingly produce a positive potential output to cause an upscale reading of the zero-center meter 48.

Conversely, if the probe of the apparatus of the present invention is receiving radiation from a location such as that shown at B in FIG. 1, the intensity of the radiation reaching the frontal area 11a of the Geiger-Mueller tube 11 will be less than the intensity of the radiation reaching the frontal area 10a of the Geiger-Mueller tube 10. Accordingly, the converse to that operation previously described will occur, with the transistor 21 developing a significantly greater signal than transistor 27. As a result, a greater input signal will be impressed upon terminal 42 of the differential amplifier 43 than that impressed upon terminal 41. Consequently, the zero-center meter 48 will produce a down-scale reading indicating that the source of radiation is above the principal axis of the probe when the probe is held in a generally vertically oriented disposition of the two Geiger-Mueller tubes 10 and 11 as shown in FIG. 1.

Thus it may be seen that the concept of the present invention provides a light-weight, small, compact and efficient radiation detector which through the use of two Geiger-Mueller tubes or other appropriate radiation responsive devices, together with a single small radiation attenuating element provides directional information with respect to the location of a source of radiation relative to two axes of rotation such as those shown at X—X and Y—Y in FIG. 1.

Since radiation responsive devices, such as Geiger-Mueller tubes, generally are non-sensitive in their frontal areas as to the direction from which radiation is received, it is possible with the apparatus of the present invention to have radiation impinging upon the frontal areas of both tubes in a substantially equal intensity so that a zero-center meter 48 reading of zero is produced. In such case, the operator will move the probe until either an up-scale or down-scale reading is obtained, indicating that further re-orientation is required relative to either one or both rotational axes. When a maximum down-scale reading is observed, the probe must be rotated about the X-axis until an up-scale reading is observed. Upon obtaining the up-scale reading, the probe must be rotated about the Y-axis until a maximum up-scale reading is obtained, which indicates the direction from which the radiation is emitted. By positioning the switch 50 to connect with terminal 52 rather than terminal 51, a higher degree of sensitivity can be afforded for the zero-center meter 48.

It is to be understood of course, in accordance with the concept of the present invention the radiation responsive devices may be of any type and that the Geiger-Mueller tubes of the illustrated embodiment are employed for illustrative purposes and not in a limiting sense.

Those skilled and knowledgeable in the art will appreciate the convenience and facility of use afforded by a small, compact and light-weight apparatus as taught by the novel concept of the present invention whereby the probe portion may include that part of the apparatus shown within the dash lines of FIG. 3, with the remainder of the circuitry and battery sources as well as a meter indicator included in a separate hand-held case.

Obviously many modifications and variations of the present invention are possible in the light of the above teachings. It is therefore to be understood that within the scope of the appended claims, the invention may be practiced otherwise than as specifically described.

What is claimed is:

1. Apparatus for detecting the direction of the source of radiation relative to first and second orthogonally disposed axes of rotation comprising:
    first and second adjacent radiation responsive means positioned in substantially contiguous parallel axial alignment and having frontal areas in a common plane for producing outputs as a function of the intensity of the radiation impinging thereon,
    said first axes of rotation being in said common plane and passing through the centers of both said frontal areas and said second axis of rotation being in said frontal plane and passing through the mid-point between said frontal areas,
    a radiation attenuating element positioned in the frontal path of and in coaxial alignment with said first radiation responsive means,
    differential amplification means connected to produce an output as a function of the difference in amplitude between the outputs produced by said first and second radiation responsive means and in accordance with the sense of said difference, and
    means receiving the output of said differential amplification means for indicating the amplitude and sense of said difference.

2. Apparatus for detecting the direction of a source of radiation as claimed in claim 1 wherein said radiation responsive means comprise substantially identical Geiger-Mueller tubes.

3. Apparatus for detecting the direction of a source of radiation as claimed in claim 1 wherein said means receiving the output of said differential amplification means comprises a zero-center meter for indicating direction relative to one said axis of rotation by an up-scale reading and direction relative to the other said axis of rotation by a down-scale reading.

4. Apparatus for detecting the direction of a source of radiation as claimed in claim 3 and including means for selectively changing the sensitivity of said meter.

5. Apparatus for detecting the direction of a source of radiation as claimed in claim 1 and including means for integrating the output of each said radiation responsive means.

6. Apparatus for detecting the direction of a source of radiation as claimed in claim 1 wherein said differential amplification means produces an output having a polarity in accordance with the sense of said difference.

7. Apparatus for detecting the direction of a source of radiation as claimed in claim 1 and including impedance matching means connected between each radiation responsive means and said differential amplification means.

8. Apparatus for detecting the direction of a source of radiation as claimed in claim 6 and including means for selectively varying the gain of said impedance matching means for balancing said apparatus.

References Cited

UNITED STATES PATENTS

| | | | |
|---|---|---|---|
| 2,778,884 | 1/1957 | Amatniek | 330—69 |
| 3,047,721 | 7/1962 | Folsom et al. | 250—71.5X |
| 3,153,203 | 10/1964 | Sem-Jacobsen et al. | 330—30D |
| 3,291,989 | 12/1966 | Campanella | 250—105 |
| 3,400,267 | 9/1968 | Tolmie | 250—83.3 |
| 3,404,276 | 10/1968 | Campanella | 250—83.3 |

ARCHIE R. BORCHELT, Primary Examiner

M. J. FROME, Assistant Examiner

U.S. Cl. X.R.

250—83.3, 105; 330—69